UNITED STATES PATENT OFFICE.

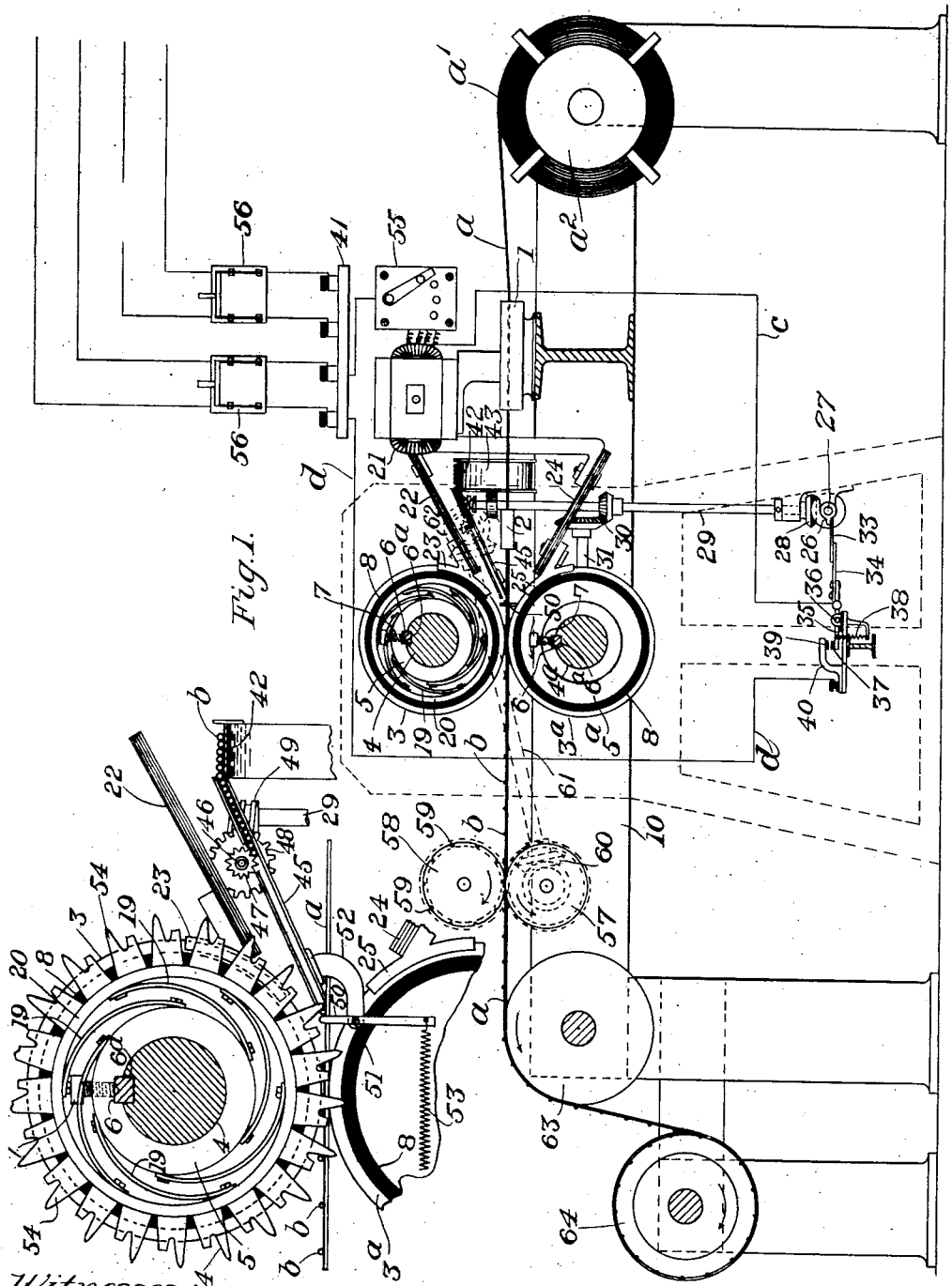

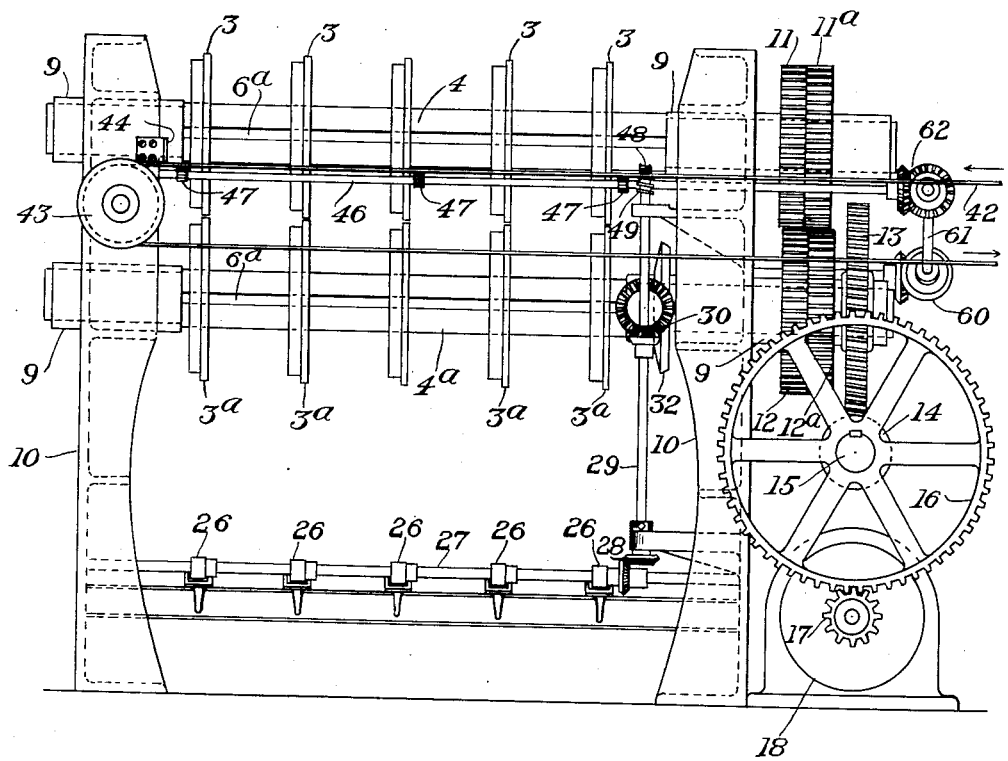

LESTER P. FRENCH, OF STOUGHTON, MASSACHUSETTS; JAMES H. FRENCH, OF STOUGHTON, MASSACHUSETTS, ADMINISTRATOR OF SAID LESTER P. FRENCH, DECEASED, ASSIGNOR, BY MESNE ASSIGNMENTS, TO THERESA J. FRENCH, OF STOUGHTON, MASSACHUSETTS.

ROTARY ELECTRIC WELDING-MACHINE.

1,175,516.      Specification of Letters Patent.      Patented Mar. 14, 1916.

Application filed February 27, 1913. Serial No. 750,971.

*To all whom it may concern:*

Be it known that I, LESTER P. FRENCH, a citizen of the United States, residing at Stoughton, in the county of Norfolk, State of Massachusetts, have invented a certain new and useful Improvement in Rotary Electric Welding-Machines, of which the following is a specification, reference being had therein to the accompanying drawings.

The features of the invention are designed more particularly for employment in cross-welding wires or strips, as for instance in the manufacture of fencing or the like composed of longitudinal wires or strips and transverse wires or strips extending across the longitudinal ones and welded thereto at the points of intersection or crossing.

A leading feature of the invention is the substitution of rotary welding contact means at one or both sides of the wires in lieu of the reciprocating contact means heretofore employed for the like class of work.

I have shown the features of the invention conveniently embodied in a machine employing rotary welding contact means at both sides of the wires.

Figure 1 is a view of the said machine in vertical longitudinal section, showing the leading essentials thereof. Fig. 2 is a view of the rolling contacts, their actuating mechanism, and the make-and-break devices therefor, omitting however the brushes which are shown in Fig. 1 in connection with the said rolling contacts, and omitting also the inclined guides for delivering the cross-wires or strips adjacent the said rolling contacts, but showing other parts of the means for feeding the cross-wires or strips to the longitudinal wires or strips. Fig. 3 is a detail view on an enlarged scale showing more particularly a pair of welding-contacts and devices for feeding transverse wires or strips.

Having reference to the drawings,—At $a$ is indicated the series of longitudinal wires or strips, hereinafter termed longitudinal wires, and at $b$, $b$, are shown transverse wires or strips, hereinafter termed cross-wires. The supply of longitudinal wires is here shown provided in the form of coils $a'$ wound upon reels $a^2$ which are conveniently supported at the rear of the machine. Other means of supply and other arrangements thereof may be employed in practice. From the source of supply the individual wires pass forward parallel with one another to and through straighteners 1, which may be of the usual wheel or rotary type or of any other approved type. The said straighteners may be dispensed with in case longitudinal strips are employed.

After passing through the straighteners the individual wires pass through guides 2 which are located close to the welding contacts and serve to hold the longitudinal wires against tendency to lateral displacement in passing between the said contacts and in being welded to the cross-wires.

The welding contacts are shown at 3, $3^a$. They are in the form of rings of conductive metal, suitable for employment for welding purposes. They are mounted upon shafts or arbors 4, $4^a$, one of the said shafts or arbors and its series of contact rings being at one side of the path of the longitudinal wires, and the other shaft or arbor and its series of contact rings being at the opposite side of the said path. Each shaft or arbor carries as many of the contact rings as there are longitudinal wires in the fabric to be produced. A contact ring upon one shaft or arbor is arranged to co-act with one upon the other shaft or arbor, forming thereby a pair of contact rings between which one of the longitudinal wires is fed continuously. Each of the contact rings is combined with its supporting shaft or arbor in a manner providing for adjustment of the respective contact rings upon the shafts or arbors in the direction of the length of the latter, thereby enabling the different pairs of contact rings to be set at distances apart, transversely of the machine, corresponding with the desired spacing of the longitudinal wires in the fabric to be produced. The mounting for each contact ring includes as a part thereof a hub 5 or $5^a$. The hubs may be made of cast-iron, and each hub is fixedly connected to its shaft or arbor by means of a key 6 occupying a keyway in the hub and a key-way $6^a$ extending longitudinally within the shaft or arbor, and a clamping-screw 7 carried by the hub and engaging with the key. Other known means of connecting the hubs with the shafts or arbors and providing for their adjustment thereon may be employed in practice. Each contact ring is insulated from its hub by means of a ring 8 of suitable insulating and preferably heat non-conducting material. Preferably, in practice, I employ what is termed "fiber" as the material of which the said rings 8 are composed.

In the present instance the shafts or arbors 4, 4a, are mounted one above the other in bearings 9, 9, Fig. 2, that are suitably supported in the side-frames 10, 10. The two shafts or arbors are geared together so as to rotate in unison, by means of a pair of spur-gears 11, 11a, upon the upper shaft or arbor 4 meshing with a pair of spur-gears 12, 12a, fixed upon the lower shaft or arbor 4a. Thereby the upper shaft or arbor and its contact rings are driven from the lower shaft or arbor. The latter, in turn, is driven by means of the worm-gear 13 thereon, engaged by a driving worm 14 on a horizontal shaft 15 having fixed thereon a spur-gear 16 in engagement with a spur-pinion 17 on the shaft of an electric motor 18. The teeth of the gear-wheels 11, 11a, alternate or break joint with one another, as shown in Fig. 2, and the same relative arrangement of teeth exists in the case of the pair of gears 12, 12a. This obviates back-lash, and enables the effects of wear to be taken up through an angular adjustment of one gear of each pair with respect to the other gear of such pair.

The contact rings of one or both shafts or arbors are yieldingly mounted so as to have capacity for radial or diametrical movement relative to the shaft or arbor. The purpose of this is to compensate for variations in the diameters of the wires as they pass between the two series of contacts. Also, to permit the contacts to adjust themselves to the diameters of the cross-wires as they enter between the two series of contacts in the cold state. Also, to enable the contacts to exert at each intersection the pressure necessary to effect the compression and bring about the union while the wires are softened by the heating. Various forms of elastic or yielding mountings may be employed in practice. I have shown the yielding feature secured in the case of the upper series of contact rings and by mounting them yieldingly upon their hubs 5. In the illustrated yielding construction, curved strips 19, 19, of steel are fastened by their inner ends to the hub 5 of each contact ring of the said upper series, and have attached to their outer ends a ring 20 upon which the fiber ring 8 and contact ring 3 are mounted. The strips 19, 19, extend tangentially or substantially so in a rearward direction.

Preferably, I employ a transformer 21 for each pair of coöperating contacts. Each transformer embodies, as usual, a primary winding and a secondary winding, the said windings being so constructed as to provide a current-output from the secondary winding of a relatively high amperage and low voltage. One secondary terminal of each transformer is electrically connected by means of a flexible conducting strip or strips 22 with a copper shoe or brush 23 electrically engaging the upper contact ring 3 of the corresponding pair of contact rings, and the other secondary terminal of such transformer is electrically connected by means of a similar strip or strips 24 with a similar shoe or brush 25 in electrical engagement with the lower contact ring 3a of such pair. The secondary circuit of the transformer is normally broken or open at the gap between the contact rings of the pair, such rings being slightly separated by an intervening space from each other.

The primary circuit is controlled by means of a suitable circuit closer and breaker, the latter employing in the present instance a cam 26 which rotates in proper coördination with the feed of the longitudinal wires and the spacing apart of the cross-wires. In the drawings, the said cam is operatively connected with the shaft or arbor 4a by mounting it upon a cam-shaft 27 driven by miter gearing 28 from an upright shaft 29, the latter in turn driven by means of bevel gearing 30 from a horizontal shaft 31, Fig. 1, which is driven by bevel gearing 32, Fig. 2, from the said shaft or arbor 4a. The said cam 26 in its rotation engages with the piece 33, Fig. 1, projecting into the path of the nose of the cam from a fiber strip 34 attached to an arm of a circuit-closing lever 35 pivotally mounted at 36, carrying a carbon tip 37, and having electrically connected with it one end of the wire c leading from one primary terminal of the transformer. A contracting spiral spring 38 connecting with the said lever 35 holds it normally in its open position, namely with the said carbon tip 37 separated from a co-acting carbon tip 39 carried by a fixed arm 40 having electrically connected therewith the wire d from the distributing-board 41. The engagement of the nose of the cam with the piece 33 carried by the circuit-closing lever 35 causes the said lever to rock so as to close the carbon points or terminals 37, 39, together, and thereby close or complete the primary circuit of the transformer. The rotation of the cam is timed to close the said circuit as each cross-wire enters into the nip of the two series of contact rings 3, 3a.

The cross-wires may be fed into position in any approved manner but I prefer the means shown in the drawings. As a part of the said means I employ a conveyer-apron or belt 42, extending crosswise of the machine and projecting some distance laterally outward at one side thereof. The projecting portion of the belt and the supporting roll or rolls for such portion are omitted from the drawings. At 43 is a roll or sheave mounted within the machine and around which the conveyer-apron or belt makes its return. The cross-wires, previously cut to the required length, are laid upon the upper run of the outwardly projecting portion of this conveyer-apron or belt by the workman, and by the travel of the said run are carried longitudinally into the machine, being arrested at the proper point in the width of the machine by a stop 44. Adjacent the conveyer-apron or belt 42, and extending downward from the upper run of the said apron or belt to the path of the longitudinal wires a, are located inclined guide-ways 45, Figs. 1 and 3. There are several of these inclined guide-ways, at proper distances apart widthwise of the machine to support and guide the cross-wires. They receive the cross-wires from the upper run of the conveyer-apron or belt 42, and guide them to the longitudinal wires. The cross-wires which have been carried into the machine by the travel of the conveyer-apron or belt may be pushed by hand from the latter into the inclined guide-ways, or any convenient means for effecting the transfer automatically may be employed in practice.

For the purpose of feeding the cross-wires one by one to the longitudinal wires a suitable feeding or escapement device is employed. In this instance the feeding device consists of a shaft 46, Fig. 3, having mounted thereon at each guide-way 45 a wheel 47 having its periphery formed with transverse grooves, each of a size to contain one cross-wire. The shaft 46 and its rolls 47, 47, are rotated by means of a worm-gear 48 upon the said shaft engaged by a worm 49 on the upright shaft 29, so that at the required moment one of the cross-wires is fed past the feed-rolls and allowed to pass down the inclined guide-ways, and thereby delivered to the longitudinal wires a.

To hold the cross-wire which has thus been delivered to the longitudinal wires a in its proper position at right angles to the longitudinal wires, and insure the proper spacing apart of the cross-wires in the fabric, I employ stops, one of which is shown at 50, Figs. 1 and 3, pivotally mounted at 51 Fig. 3 upon a support 52 and held in working position by means of a contracting spiral spring 53. As a cross-wire leaves the inclined guide-ways 45 it encounters the stops 50 and is held back thereby.

The cross-wires are successively fed forward past the stops 50 at the required times, in unison with the advancing movement of the longitudinal wires a, through the engagement of outstanding portions of radial projections 54 carried in this instance by the rings 20 of the upper shaft or arbor 4, as represented in Fig. 3. The outstanding portion of one of the said projections, by passing behind a cross-wire resting on the longitudinal wires a, engages with such cross-wire and moves it forward in unison with the longitudinal wires, the stops 50 yielding to permit the passage of the cross-wire and then springing back into their normal position. The cross-wire becomes entered in a notch of the projection 54 in front of the said outstanding portion, and is thereby held from becoming displaced in passing into the nip of the two sets of contact rings, and is held and fed positively in passing through the said nip and until in consequence of the welding it has become firmly united to the longitudinal wires at the points of intersection.

At 55 is indicated the rheostat controlling the amperage of the current traversing the primary winding of the transformer, and so adjusting the amperage of the secondary current as required, and 56, 56, are switches in connection with the wires represented in connection with the said distributing board.

The fabric is fed along, and the longitudinal wires a are drawn forward from the coils a' on the reels a², by means of a pair of feed rolls 57, 58, Fig. 1. The said feed-rolls are located in suitable position in front of the rotary contacts, and one or both of said rolls is longitudinally grooved, as at 59, 59, in the case of the top roll, to receive the cross-wires of the fabric, thereby enabling the feed-rolls to take secure hold of the fabric for the purpose of pulling it and the longitudinal wires through the machine. The lower feed-roll, 57, is represented as driven by miter gearing 60, inclined shaft 61, and miter gearing 62, from the feed-shaft 46 for the cross-wires. From the feed-rolls 57, 58, the fabric passes to and partly around a guide-roll 63 at the front of the machine and is wound upon a take-up or receiving roll 64.

The essential features of the machine may be variously embodied without involving a departure from the spirit of the invention.

Some of the features of the invention are not restricted to employment with rotary or rolling welding-contacts.

I claim as my invention:—

1. An electric welding machine comprising means for feeding a series of wires or strips, welding-contact means at one side of the said series, and rotary welding-contact means at the other side of said series applying roller welding pressure at the welding points to the said wires or strips and the cross-wires or strips passing therewith between the respective welding contacts.

2. An electric welding machine comprising means for feeding a series of wires or strips, rotary welding-contact means at both sides of said series applying rolling welding-pressure at the welding points to the said wires or strips and the cross-wires or strips passing therewith between the respective welding contacts.

3. An electric welding machine comprising means for feeding a series of wires or strips, a plurality of welding contacts at one side of the said wires, rotary welding-contact means at the other side of said series, the two series of contacts adjustable to suit varied distances between the wires or strips of said series, and arranged to apply welding pressure at the separate points of intersection of the wires or strips of said series and the cross-wires or strips.

4. An electric welding machine comprising means for feeding a series of wires or strips, a plurality of pairs of rotary welding contacts respectively applying rolling welding-pressure at the separate points of intersection of the wires or strips of said series and the cross-wires or strips, and also adjustable to suit varied distances between the wires or strips of said series.

5. An electric welding machine comprising means for feeding a series of wires or strips longitudinally, means for automatically delivering cross-wires or strips in position upon the said series, and electric-welding means for welding the wires together at the respective points of intersection.

6. An electric welding machine comprising rolling welding-contacts, means for feeding a series of wires or strips longitudinally between said welding-contacts, and means for automatically delivering cross-wires or strips in position to pass between said welding-contacts and be welded in place upon the longitudinal wires.

7. An electric welding machine comprising welding-contacts, means for feeding a series of wires or strips longitudinally between the said contacts, inclined guides adjacent the paths of said wires or strips, and means for feeding cross-wires or strips successively from said guides to the said series of wires.

8. An electric welding machine comprising welding-contacts, means for feeding a series of wires or strips longitudinally between the said contacts, a receiver adapted to contain a plurality of cross-wires, means for feeding cross-wires successively from said receiver into position to be united to the longitudinal wires or strips, and a carrier adapted to transport the cross-wires into position and deliver them to the said receiver.

9. An electric welding machine comprising welding-contacts, means for feeding a series of wires or strips longitudinally between the said contacts, means for conveying cross-wires or strips into position adjacent said series, inclined guides receiving the cross-wires or strips from the said conveying means, and means for feeding the cross-wires or strips from the inclined guides to the said series of wires or strips.

10. An electric welding machine comprising rolling contacts, means for guiding longitudinal wires or strips between said contacts, and means for automatically presenting cross-wires or strips in position to enter between said contacts and be welded to the longitudinal wires or strips.

11. An electric welding machine comprising rolling contacts, means for guiding longitudinal wires or strips between said contacts, and means rotating in unison with said contacts for causing cross-wires to enter successively between the contacts and become united by welding to the longitudinal wires or strips.

12. An electric welding machine comprising rolling contacts, means for guiding longitudinal wires or strips between said contacts, and means engaging positively with a cross-wire or strip to cause same to enter between the contacts and hold it from displacement while being welded to the longitudinal wires or strips.

In testimony whereof I affix my signature in presence of two witnesses.

LESTER P. FRENCH.

Witnesses:
NATHAN B. DAY,
CHAS. F. RANDALL.